(12) United States Patent
Park et al.

(10) Patent No.: US 10,674,342 B2
(45) Date of Patent: Jun. 2, 2020

(54) ELECTRONIC DEVICE AND METHOD FOR PROVIDING LOCATION INFORMATION OF USER IN EMERGENCY

(71) Applicant: Samsung Electronics Co., Ltd., Gyeonggi-do (KR)

(72) Inventors: Inkook Park, Gyeonggi-do (KR); Jaemin Kye, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/271,953

(22) Filed: Feb. 11, 2019

(65) Prior Publication Data

US 2019/0253862 A1 Aug. 15, 2019

(30) Foreign Application Priority Data

Feb. 14, 2018 (KR) .......................... 10-2018-0018163

(51) Int. Cl.
*H04W 4/90* (2018.01)
*H04W 4/029* (2018.01)
*H04W 4/80* (2018.01)

(52) U.S. Cl.
CPC ............. *H04W 4/90* (2018.02); *H04W 4/029* (2018.02); *H04W 4/80* (2018.02)

(58) Field of Classification Search
CPC ....... H04W 76/50; H04W 4/02; H04W 4/029; H04W 4/90; H04W 4/80; H04L 65/1006;

(Continued)

(56) References Cited

U.S. PATENT DOCUMENTS 8,340,630 B1 12/2012 Ward
2005/0197137 A1* 9/2005 Radic .................. G01S 19/09
455/456.1

(Continued)

FOREIGN PATENT DOCUMENTS

| KR | 10-1007603 B1 | 1/2011 |
| KR | 10-1022997 B1 | 3/2011 |
| WO | 2017/175997 A1 | 10/2017 |

OTHER PUBLICATIONS

International Search Report dated May 17, 2019.

*Primary Examiner* — Quoc Thai N Vu
(74) *Attorney, Agent, or Firm* — Cha & Reiter, LLC

(57) ABSTRACT

An electronic device and method are disclosed. The electronic device includes a processor which implements the method, including establishing a first communication session for a voice call with a first external electronic device using a short-range wireless communication module operably connected to the electronic device, transmitting a request for location information of the electronic device to a second external electronic device via the short-range wireless communication module, when a response to the request is not received from the second external electronic device and when an input is detected requesting an emergency call, establishing a second communication session for the emergency call with the first external electronic device using the short-range wireless communication module, and after receiving the location information from the second external electronic device, updating the first or second communication session by transmitting the received location information to the first external electronic device using the short-range wireless communication module.

20 Claims, 6 Drawing Sheets

(58) Field of Classification Search
CPC .......... H04L 65/1016; H04M 2242/04; H04M 15/56; H04M 1/72536; H04M 2242/30; H04M 2250/10; H04M 3/5116
See application file for complete search history.

(56) References Cited

U.S. PATENT DOCUMENTS

| | | |
|---|---|---|
| 2007/0135089 A1 | 6/2007 | Edge et al. |
| 2009/0238170 A1 | 9/2009 | Rajan et al. |
| 2016/0105784 A1* | 4/2016 | Gellens ................ H04M 3/5116 455/404.1 |
| 2016/0150574 A1* | 5/2016 | Edge ....................... H04W 4/02 455/404.2 |
| 2016/0219397 A1 | 7/2016 | Mayor et al. |
| 2019/0110683 A1 | 4/2019 | Kim et al. |

* cited by examiner

ELECTRONIC DEVICE AND METHOD FOR PROVIDING LOCATION INFORMATION OF USER IN EMERGENCY

CROSS-REFERENCE TO RELATED APPLICATION(S)

This application is on the basis of and claims priority under 35 U.S.C. § 119 to Korean Patent Application No. 10-2018-0018163, filed on Feb. 14, 2018, in the Korean Intellectual Property Office, the disclosure of which is incorporated by reference herein in its entirety.

BACKGROUND

1) Field

The disclosure relates to an electronic device, and, more particularly, to an electronic device configured to transmit location information as a user makes an emergency call.

2) Description of Related Art

Trending developments in communication technology have resulted in existing circuit switching (CS) scheme displayed by a packet switching (PS) scheme for voice calls, and the implementation of various voice call services in the PS scheme, such as a voice-over-Wi-Fi (VoWi-Fi) service and a voice-over-long-term evolution (VoLTE) service.

An electronic device (user terminal) can communicate with an emergency station using VoWi-Fi or VoLTE when a user makes an emergency call. For example, the user terminal may transmit a message requesting an emergency call to the emergency station using VoWi-Fi. At this time, location information of the user terminal may also be transmitted to the emergency station along with the request, so that the emergency station can recognize the user location.

The above information is presented as background information only to assist with an understanding of the present disclosure. No determination has been made, and no assertion is made, as to whether any of the above might be applicable as prior art with regard to the present disclosure.

SUMMARY

The location information of a user terminal may be obtained by the user terminal from a server through wireless communication with the server. However, the user terminal may fail to receive the location information at the right moment. For example, the location information may not be received before the user terminal makes an emergency call, because of the interference and obstructions in the radio wave environment between the user terminal and an emergency call server. Likewise, due to heavy system load in the emergency call server, the emergency call could in some cases be terminated before the location information is received at the emergency station. In such cases, first responders may be unable to determine the user's location to dispatch rescuers.

An electronic device according to certain embodiments enables the emergency station to recognize the location of a user who makes an emergency call.

An electronic device according to certain embodiments may include: an input device, a short-range wireless communication module, at least one processor electrically connected to the input device, the short-range wireless communication module, a memory storing program instructions executable by the at least one processor to cause the electronic device to: establish a first communication session for a voice call with a first external electronic device using the short-range wireless communication module, transmit a request for location information of the electronic device to a second external electronic device via the short-range wireless communication module, when a response to the request is not received from the second external electronic device, and when an input is detected requesting an emergency call, establish a second communication session for the emergency call with the first external electronic device via the short-range wireless communication module, and after receiving the location information from the second external electronic device, updating the first or second communication session by transmitting the received location information to the first external electronic device via the short-range wireless communication module. A method of operating an electronic device according to certain embodiments may include: establishing a first communication session for a voice call with a first external electronic device using a short-range wireless communication module operably connected to the electronic device, transmitting a request for location information of the electronic device to a second external electronic device via the short-range wireless communication module, when a response to the request is not received from the second external electronic device and when an input is detected requesting an emergency call, establishing a second communication session for the emergency call with the first external electronic device using the short-range wireless communication module, and after receiving the location information from the second external electronic device, updating the first or second communication session by transmitting the received location information to the first external electronic device using the short-range wireless communication module. An electronic device according to certain embodiments may include an input device, a short-range wireless communication module, a memory electrically connected to the processor, wherein the memory comprises instructions that, when executed, cause the processor to perform the operations including: establishing a first communication session for a voice call with the first external electronic device via the short-range wireless communication module, transmitting a request for location information of the electronic device to a second external electronic device via the short-range wireless communication module, when a response to the request is not received from the second external electronic device and when an input is detected requesting an emergency call, generating a second communication session for the emergency call with the first external electronic device using the short-range wireless communication module, and after receiving the location information from the second external electronic device, updating the first or second communication session by transmitting the received location information to the first external electronic device using the short-range wireless communication module.

According to certain embodiments, the location information of a user in emergency can be transmitted from the user terminal to the emergency station, thereby improving the ability to deal with the emergency situation of the user.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
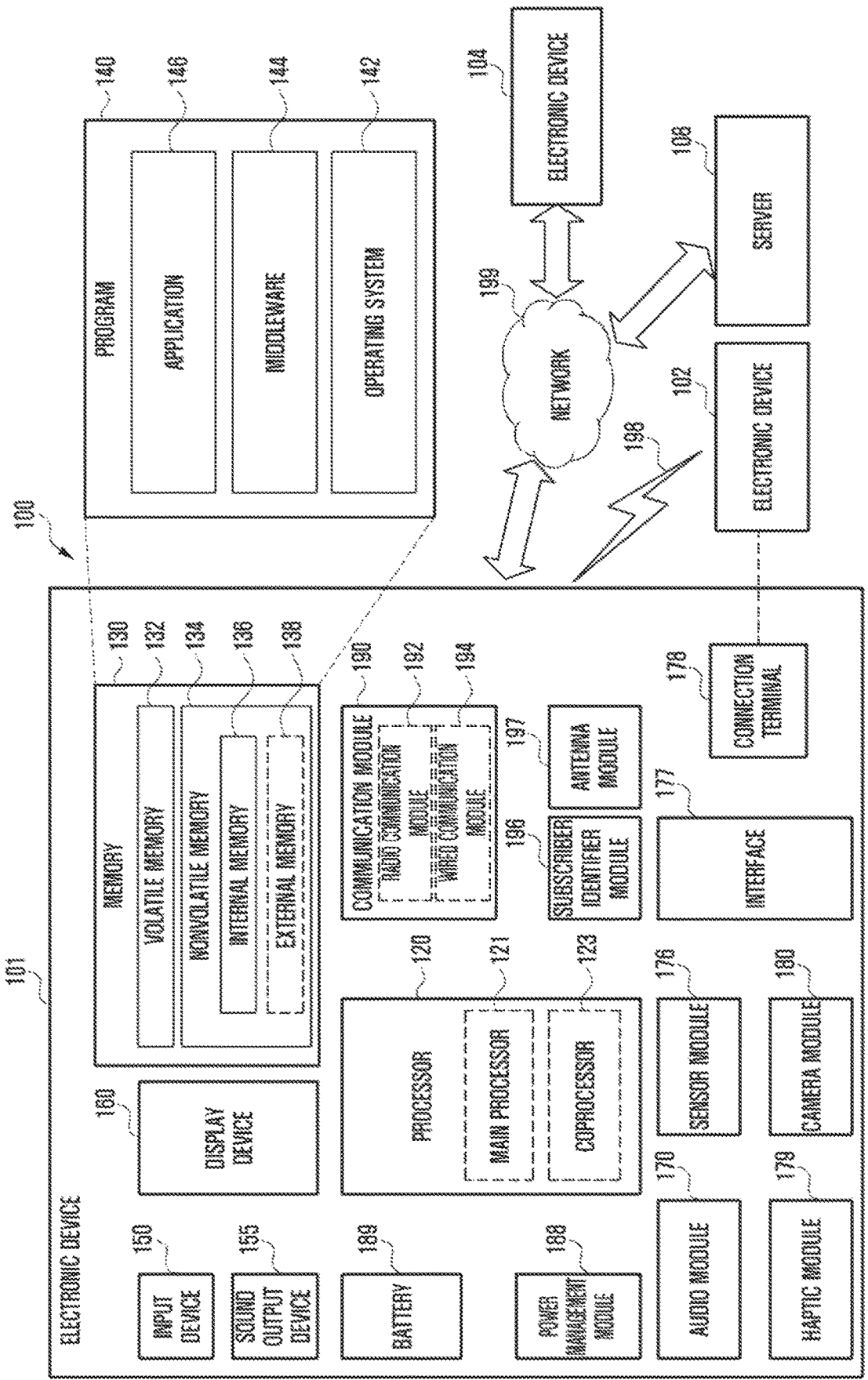
FIG. 1 illustrates an electronic device in a network environment in certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 (e.g., a connection port) may include a connector via which the electronic device 101 may be physically connected with the external electronic device (e.g., the electronic device 102). According to an embodiment, the connecting terminal 178 (e.g., a connection port) may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
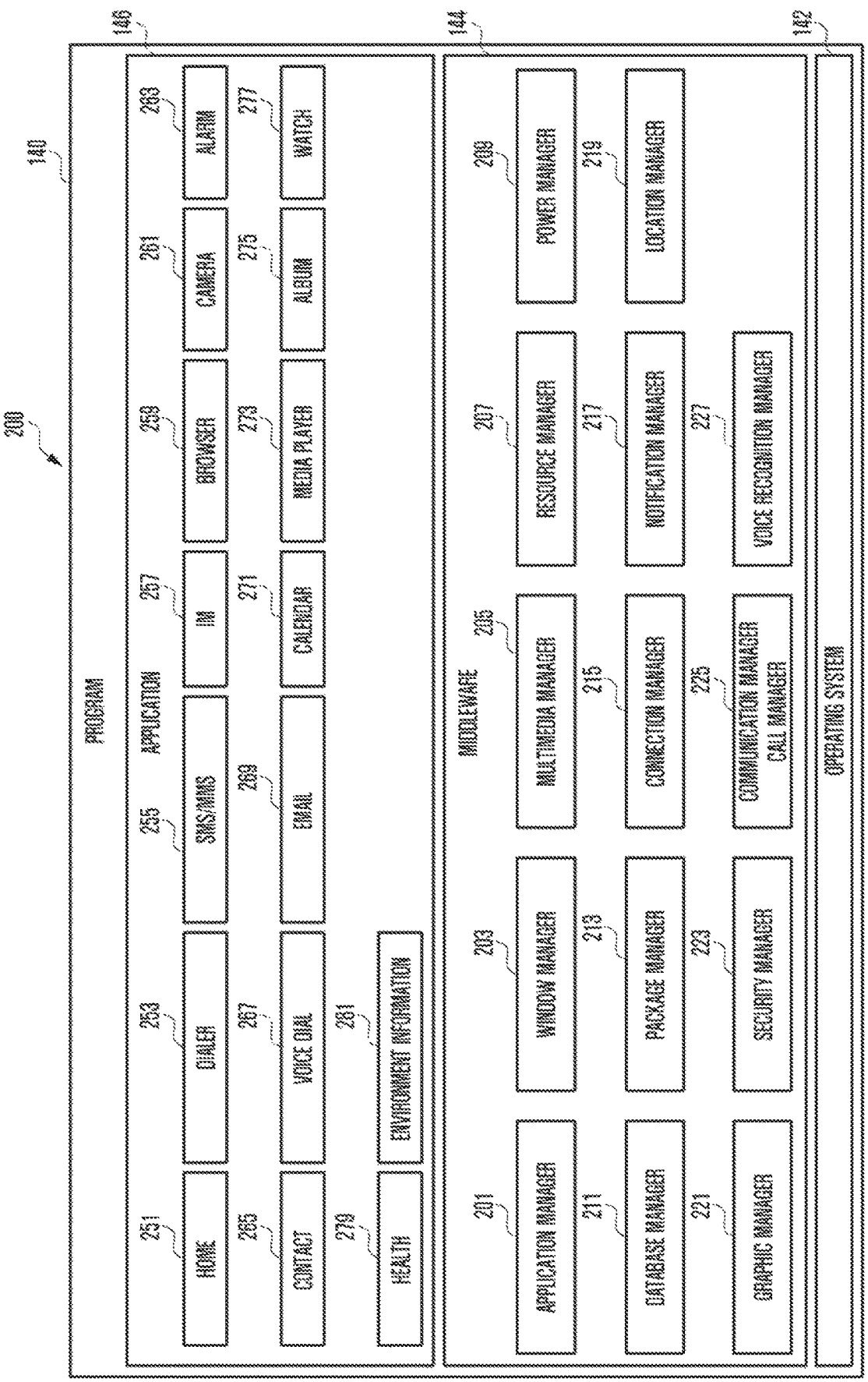
FIG. 2 is a block diagram of a program module according to certain embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
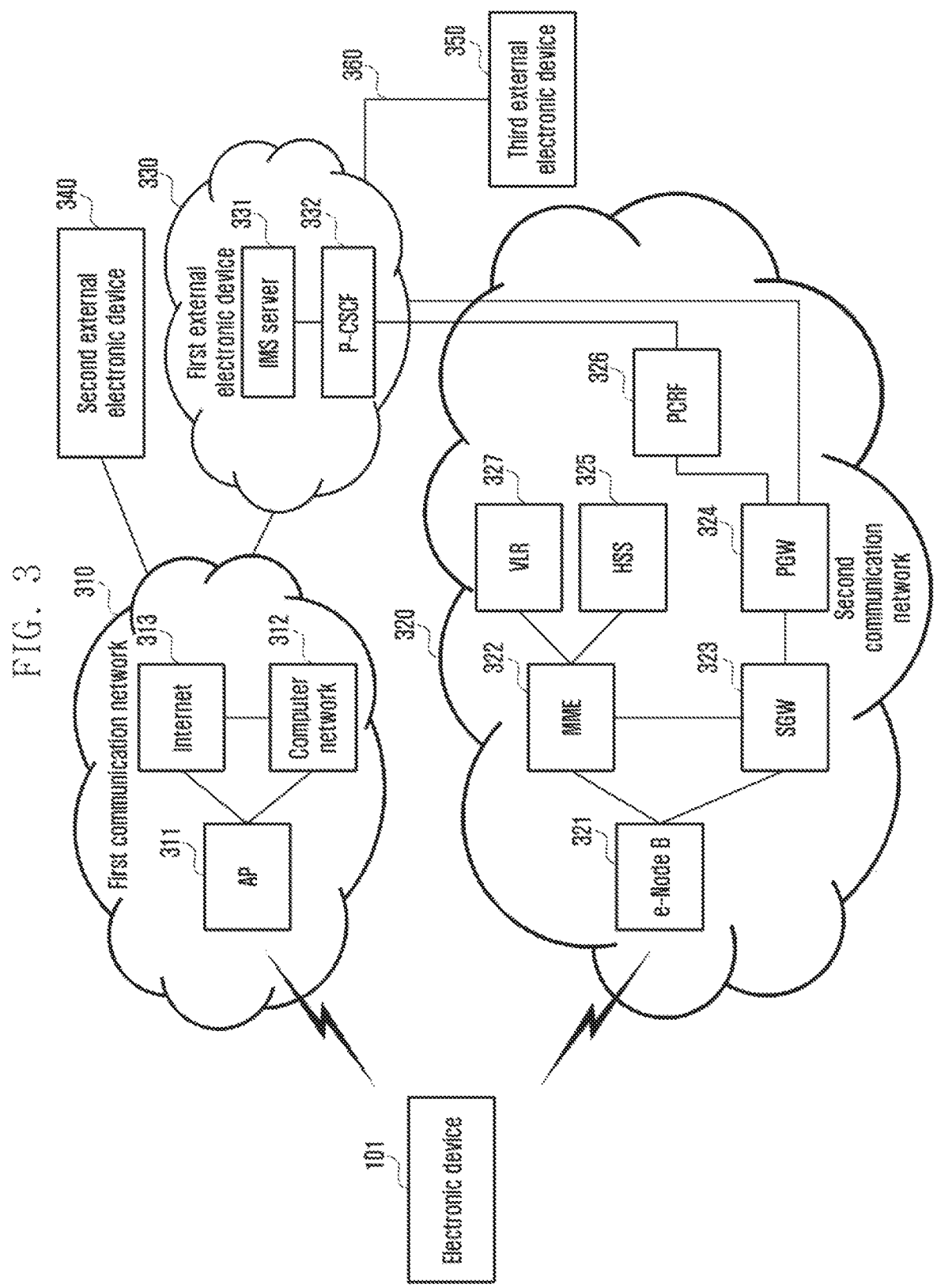
FIG. 3 illustrates a network environment according to certain embodiments.

FIG. 3 illustrates a network environment according to certain embodiments.

In certain embodiments, an electronic device 101 may be connected to a first communication network 310 and/or a second communication network 320 via a wireless communication module (e.g., the wireless communication module 192 in FIG. 1). For example, the electronic device 101 may be connected to the first communication network 310 via a short-range wireless communication module, and/or may be connected to the second communication network 320 via a cellular communication module.

In certain embodiments, the electronic device 101 may be user equipment (UE) that is configured to be connected to a first external electronic device 330 via the first communication network 310 and/or the second communication network 320, thereby providing a user with a voice call service in the PS scheme. For example, the electronic device 101 may be connected to the first external electronic device 330 via the first communication network 310, and may provide the user with a first voice call service in the PS scheme {a voice-over-internet protocol (VoIP) service such as VoWi-Fi}. The electronic device 101 may be connected to the first external electronic device 330 via the second communication network 320, and may provide the user with a second voice call service in the PS scheme (e.g., VoLTE).

In certain embodiments, the first communication network 310 may include an access point (AP) 311, a computer network 312, and the Internet 313. Here, the access point 311 may operate as a base station in the first communication network 310. For example, the access point 311 may support a connection between the Internet 313 (or the Internet 313 via the computer network 312) and the electronic device 101 using Wi-Fi technology.

In certain embodiments, the second communication network 320 may include a cellular network that supports data communications in the PS and CS schemes. According to an embodiment, the cellular network may include, as devices implementing the LTE network, an e-Node B 321, a mobility management entity (MME) 322, a serving gateway (SGW) 323, a packet data network gateway (PGW) 324, a home subscriber server (HSS) 325, a policy and charging rule function (PCRF) 326, and a visited location register (VLR) 327.

In certain embodiments, the e-Node B 321 may include one or more transceivers that perform wireless communication with the electronic device 101. The e-Node B 321 may operate as a base station associated with one cell, may broadcast cell information (e.g., a unique cell ID of the e-Node B), and may perform ciphering and deciphering of user and control data. The e-Node B 321 may be configured to perform the radio resource management of users, handover decision, scheduling, and the like in the uplink and/or downlink.

In certain embodiments, the MME 322 may verify the user of the electronic device 101. Further, the MME 322 may control the communication between the e-Node B 321 and the SGW 323. For example, the MME 322 may select a specific SGW, among the SGWs, as a router of the data that the e-Node B 321 receives from the electronic device 101.

In certain embodiments, the SGW 323 may execute a function of anchoring the electronic device 101 when the electronic device 101 conducts a handover {e.g., the movement from the zone of the e-Node B 321 to the zone of another e-Node B 321 or the movement between a 3GPP network and an evolved UMTS terrestrial radio access network (E-UTRAN)}.

In certain embodiments, the PGW 324 may operate as a gateway through which data traffic enters the first external electronic device 330 in the second communication network 320, and may execute a function of anchoring the electronic device 101 when the electronic device 101 conducts a handover (e.g., the movement between LTE and another network).

In certain embodiments, the HSS 325 may provide the MME 322 with information (e.g., key or subscriber profile) utilized for the user verification of the electronic device 101.

In certain embodiments, the PCRF device 326 may support a voice call service (e.g., VoLTE), and may manage service charging and policy for each subscriber.

In certain embodiments, in order to utilize user information {e.g., international mobile subscriber identity (IMSI)} of the electronic device 101 in a user access region (e.g., cell associated with the e-Node B 321 wirelessly connected to the electronic device 101), the VLR 327 may retrieve the user information from a subscriber database {e.g., home location register (HLR)}, and may store the same temporarily.

In certain embodiments, the first external electronic device 330 may be configured to connect to the electronic device 101 via the first communication network 310 or the second communication network 320, thereby providing a voice call service in the PS scheme to the electronic device 101. For example, the first external electronic device 330 may include an internet protocol multimedia subsystem (IMS) server 331 configured to provide a multimedia service, such as Internet protocol (IP)-based voice, audio, video, and data services, and a packet call session control function (P-CSCF) device 332, which are devices of a mobile service provider operating the second communication network 320. For example, the IMS server 331 may provide VoLTE as a voice call service to the electronic device 101 using the session initiation protocol (SIP).

In certain embodiments, the second external electronic device 340 may communicate with the electronic device 101 via the first communication network 310, thereby providing the electronic device 101 with location information of the electronic device 101. For example, the second external electronic device 340 may receive information {e.g., at least one piece of cell identification information (cell ID), network information of the access point 311 (e.g., IP address), or global positioning system (GPS) information (latitude and longitude)} related to the location information from the electronic device 101 via the first communication network 310, may obtain the location information (e.g., civic address including country, city, street, and lot number) of the electronic device 101 using the received information, and may reply to the electronic device 101 via the first communication network 310.

In certain embodiments, a third external electronic device 350 may connect to the first external electronic device 330 via a predetermined network {e.g., public switched telephone network (PSTN)} 360. The third external electronic device 350 may be a device in the emergency station, which is configured to receive an emergency call from the electronic device 101 by means of a relay of the first external electronic device 330. In addition, the third external electronic device 350 may receive location information from the electronic device 101 via the first external electronic device 330.

Figure 4:
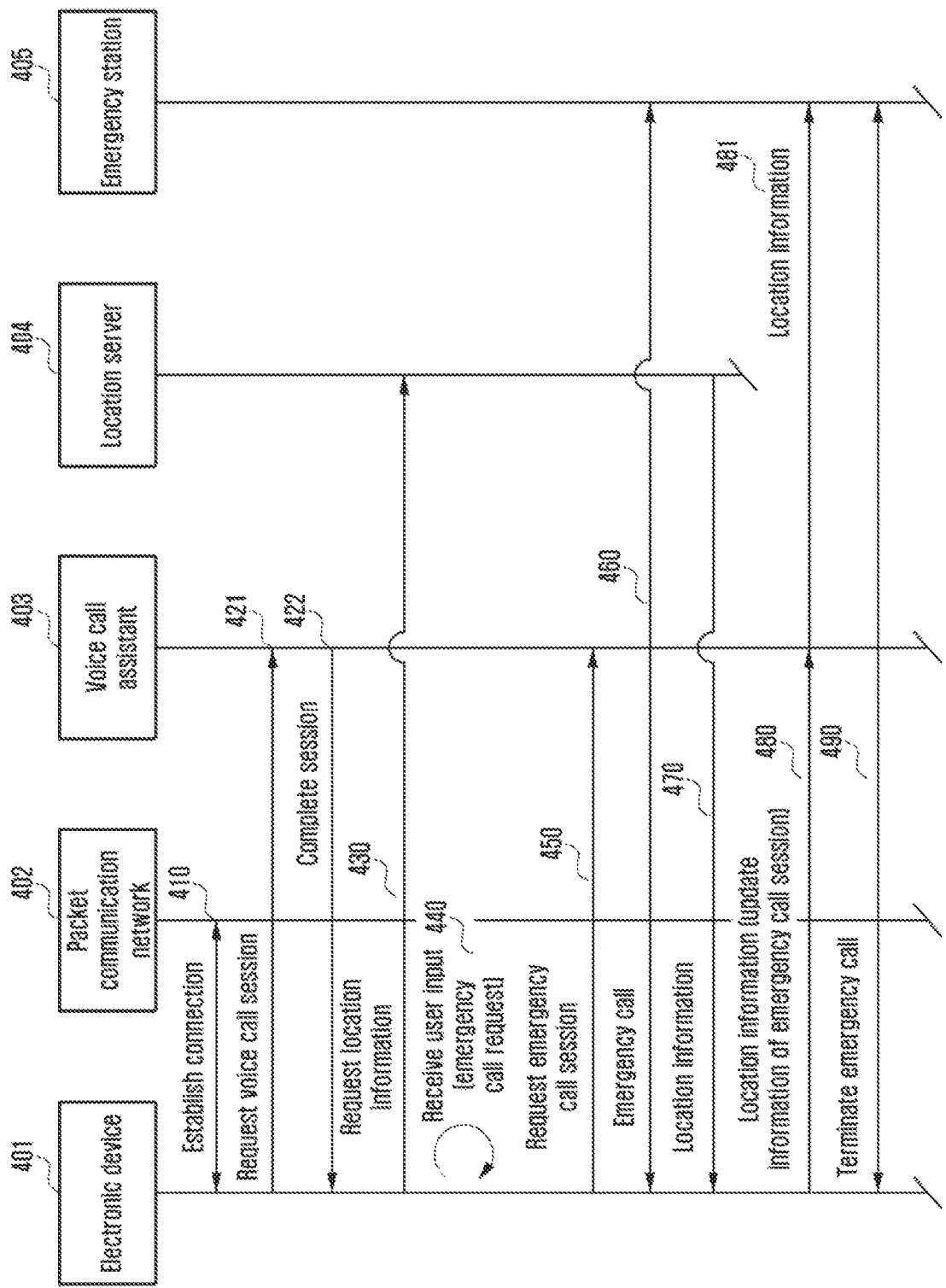
FIG. 4 is a flowchart explaining the operations of an electronic device and an external electronic device in certain embodiments.

FIG. 4 is a flowchart explaining the operations of an electronic device and an external electronic device in certain embodiments.

According to certain embodiments, in operation 410, a processor (e.g., the processor 120 in FIG. 1) of an electronic device 401 (e.g., the electronic device 101 in FIG. 1) may establish a connection with a packet communication network 402 (e.g., the first communication network 310 in FIG. 3) via a short-range wireless communication module. For example, the processor may identify an access point (e.g., the AP 311 in FIG. 3) by means of a message (e.g., beacon frame) received by transmission from the access point (e.g., broadcasts) to the electronic device 401. Using the received message, the processor of the electronic device 401 may identify the network information (e.g., IP address) and name {e.g., service set identification (SSID) or basic service set identification (BSSID)} of the access point. The electronic device 401 may transmit a connection request message (e.g., including a connection password) to the access point, and, in response to the connection request, the access point may transmit a message confirming approval of the requested connection to the electronic device 401, in turn establishing a connection between the electronic device 401 and the packet communication network 402. Thus, the processor of the electronic device 401 may communicate with an external electronic device (e.g., the first external electronic device 330, the second external electronic device 340, or the third external electronic device 350 in FIG. 3) via the short-range wireless communication module.

According to certain embodiments, if the connection with the packet communication network 402 is established, the processor of the electronic device 401 may establish a connection with a voice call assistant 403 (e.g., the first external electronic device 330 in FIG. 3). For example, in operation 421, the processor of the electronic device 401 may generate a message requesting a voice call session (e.g., VoWi-Fi), and may transmit the generated message to the voice call assistant 403 via the short-range wireless communication module. The request message may include information {e.g., mobile service subscriber information (e.g., international mobile subscriber identity (IMSI)) or mobile phone number}, which enables the voice call assistant 403 to identify the electronic device 401. In addition, the request message may include information negotiating with the voice call assistant 403 for a program (e.g., video codec or packet encryption algorithm included in the program 140 in FIG. 2) used for the packet communication via the session. In response to the session request, in operation 422, the processor of the electronic device 401 may receive a session completion message from the voice call assistant 403 via the short-range wireless communication module. The session completion message may include a result of the negotiation, and the processor of the electronic device 401 may determine from information included within a program to be later used for packet communication (e.g., PS-based voice call) using the same.

According to certain embodiments, in operation 430, the processor of the electronic device 401, if a connection with the voice call assistant 403 is established, may transmit, to a location server 404 (e.g., the second external electronic device 340 in FIG. 3), a message requesting location information via the short-range wireless communication module. For example, the processor of the electronic device 401 may transmit, to the location server 404 via the short-range wireless communication module, a message including at least one piece of network information (e.g., IP address) of an access point (e.g., the AP 311 in FIG. 3) connecting the electronic device 401 to the packet communication network 402, GPS information (latitude and longitude) obtained via the wireless communication module (e.g., the wireless communication module 192 in FIG. 1), or cell information obtained from a cellular network (e.g., the second communication network 320 in FIG. 3) via the wireless communication module.

According to an embodiment, the processor may transmit at least one piece of the network information or GPS information of the access point, excluding the cell information, to the location server 404 via the short-range wireless communication module. For example, if the cellular communication module of the electronic device 401 is in an inactive state, or if the electronic device 401 is located in an area where the cell information is hardly received even if the cellular communication module is active, at least one piece of the network information or GPS information of the access point may be transmitted to the location server 404.

According to another embodiment, the processor of the electronic device 401 may transmit the GPS information, excluding the cell information and the network information, to the location server 404 via the short-range wireless communication module.

According to another embodiment, the processor of the electronic device 401 may transmit all of the cell information, the network information, and the GPS information to the location server 404 via the short-range wireless communication module.

According to certain embodiments, in the state in which a response of the location server 404 is not transmitted to the electronic device 401, the processor of the electronic device 401 may receive a user input requesting an emergency call in operation 440. For example, the processor of the electronic device 401 may receive, from a touch-sensitive display (e.g., the display 160 in FIG. 1), a selection or activation of a displayed button selectable to execute an emergency call, which may then be displayed on the display. In addition, the processor of electronic device 401 may receive an audio signal (e.g., sound or user's speech) from a microphone (e.g., the microphone of the input device 150 in FIG. 1) or a connection port (e.g., the audio connector of the connection port 178 in FIG. 1), and may recognize the received audio signal as a user input requesting execution of an emergency call, by processing the received audio signal using a voice recognition module (e.g., voice recognition manager 227 in FIG. 2).

According to certain embodiments, in operation 450, the processor of the electronic device 401, in response to the user input, may transmit a request for an emergency call to the voice call assistant 403 via the short-range wireless communication module. For example, the processor of the electronic device 401 may generate a message requesting a dedicated session {e.g., emergency packet data network (EPDN) session} for an emergency call, and may transmit the generated message to the voice call assistant 403 via the short-range wireless communication module. The generated request message may include the location information (e.g., including at least one piece of cell information, network information, and GPS information) obtained from the electronic device 401 requesting an emergency call.

According to certain embodiments, in response to the emergency call request from the electronic device 401, the voice call assistant 403 may connect the emergency station 405 (e.g., the third external electronic device 350 in FIG. 3) to the electronic device 401, and thus, in operation 460, the processor of the electronic device 401 may communicate with the emergency station 405 via the short-range wireless communication module, thereby providing the emergency call service to the user.

According to certain embodiments, in the state in which the electronic device 401 is communicating with the emergency station 405 (i.e., when the user of the electronic device 401 is talking to a staff in the emergency station 405 on the phone), the processor of the electronic device 401 may receive location information of the electronic device 401 from the location server 404 via the short-range wireless communication module in operation 470.

According to certain embodiments, in operation 480, the processor of the electronic device 401 may transmit location information received from the location server 404 to the voice call assistant 403 via the short-range wireless communication module. In operation 481, the voice call assistant 403 may transmit the received location information of the electronic device 401 to the emergency station 405. Accordingly, personnel staff of the emergency station 405 can accurately recognize the location of a user in emergency, and rapidly dispatch other personnel to aid the user. Meanwhile, the received location information may be included in an update message associated with the dedicated session (e.g., EPDN session) for an emergency call to then be transmitted to the voice call assistant 403. For example, as shown in Table 1 below, "civicAddress" may be included in "SIP update message format" of the EPDN session, and may be transmitted to the voice call assistant 403. The voice call assistant 403 may obtain the location information (e.g., "civicAddress") from the received update message information, thereby transmitting the same to the emergency station 405.

TABLE 1

[-->] Update sip:119;phone-context=testlab.samsung.com@testlab.samsung.com;user=phone SIP/2.0
Via: SIP/2.0/TCP [2a00:8a00:7001:49e8::1]:6300;branch=z9hG4bK-524287-1---f7fe134edd266790;rport;transport=TCP
<?xml version="1.0" encoding="UTF-8"?>
  <gp:geopriv>
    <gp:location-info>
      <gs:Circle              xmlns:gs=
"http://www.opengis.net/pidflo/1.0"
srsName="urn:ogc:def:crs:EPSG::4326">
        <gml:pos>47.5815172 -122.1474094</gml:pos>
        <gs:radius uom="urn:ogc:def:uom:EPSG::9001">20.000000
        </gs:radius>
      </gs:Circle>
      <con:confidence pdf="normal">68</con:confidence >
      <cl:civicAddress>
        <cl:country>US</cl:country>
        <cl:A1>Washington</cl:A1>
        <cl:A3>Bellevue</cl:A3>
        <cl:A6>146th Pl SE</cl:A6>
        <cl:HNO>3245</cl:HNO>
        <cl:PC>98007</cl:PC>
      </cl:civicAddress>
    </gp:location-info>
  </gp:geopriv>

According to certain embodiments, after the location information of the electronic device 401 is transmitted to the emergency station 405, the processor of the electronic device 401 may terminate the emergency call service by terminating the connection (e.g., terminating the EPDN session) between the emergency station 405 and the electronic device 401 via the short-range wireless communication module in operation 490.

Figure 5:
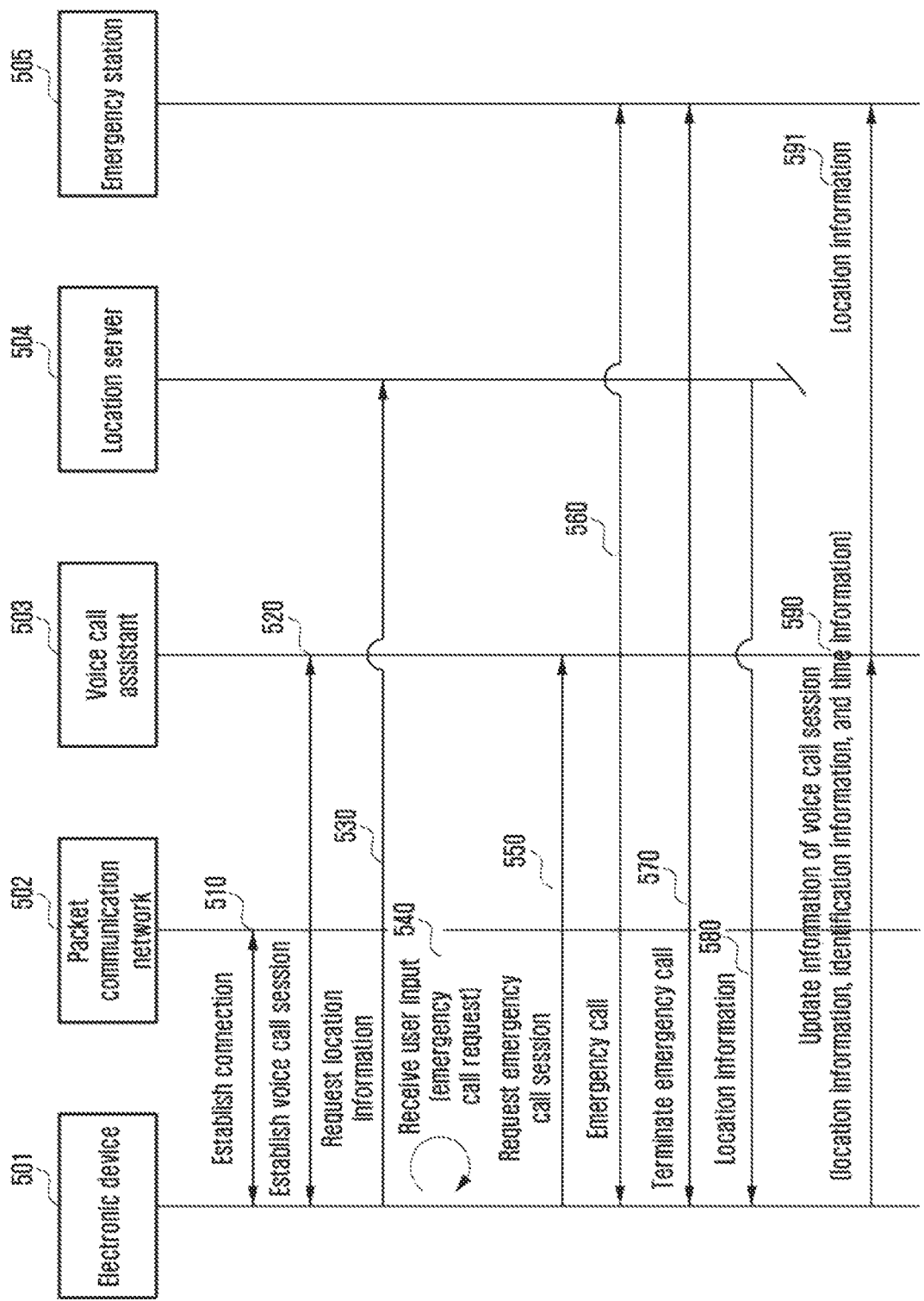
FIG. 5 is a flowchart explaining the operations of an electronic device and an external electronic device in certain embodiments.

FIG. 5 is a flowchart explaining the operations of an electronic device and an external electronic device in certain embodiments.

According to certain embodiments, in operation 510, a processor (e.g., the processor 120 in FIG. 1) of an electronic device 501 (e.g., the electronic device 101 in FIG. 1 or the electronic device 401 in FIG. 4) may establish a connection with a packet communication network 502 (e.g., the first communication network 310 in FIG. 3 or the packet communication network 402 in FIG. 4) via a short-range wireless communication module. According to the established connection, the processor of the electronic device 501 may communicate with an external electronic device (e.g., the first external electronic device 330, the second external electronic device 340, or the third external electronic device 350 in FIG. 3) via the short-range wireless communication module.

According to certain embodiments, if the connection with the packet communication network 502 is established, the processor of the electronic device 501 may establish a voice call session (e.g., VoWi-Fi) with a voice call assistant 503 (e.g., the first external electronic device 330 in FIG. 3) in operation 520.

According to certain embodiments, if a connection with the voice call assistant 503 is established, the processor of the electronic device 501 may transmit, to a location server 504 (e.g., the second external electronic device 340 in FIG. 3), a message requesting location information via the short-range wireless communication module in operation 530. For example, the processor of the electronic device 501 may transmit, to the location server 504 via the short-range wireless communication module, a message including at least one piece of network information (e.g., IP address) pertaining to an access point connecting the electronic device 501 to the packet communication network 502, GPS information (latitude and longitude) obtained via the wireless communication module (e.g., the wireless communication module 192 in FIG. 1), or cell information obtained from a cellular network (e.g., the second communication network 320 in FIG. 3) via the wireless communication module.

According to certain embodiments, in the state in which a response of the location server 504 is not transmitted to the electronic device 501, the processor of the electronic device 501 may receive a user input requesting an emergency call by input to a touch-sensitive display (e.g., the display 160 in FIG. 1), an input device (e.g., the input device 150 in FIG. 1), or a connection port (e.g., the connection port 178 in FIG. 1) in operation 540.

According to certain embodiments, in operation 550, the processor of the electronic device 501, in response to the user input, may transmit a request for an emergency call session (e.g., EPDN) to the voice call assistant 503 via the short-range wireless communication module.

According to certain embodiments, in response to the emergency call request of the electronic device 501, the voice call assistant 503 may connect the emergency station 505 (e.g., the third external electronic device 350 in FIG. 3) to the electronic device 501, and thus, in operation 560, the processor of the electronic device 501 may communicate with the emergency station 505 via the short-range wireless communication module, thereby providing an emergency call service to the user.

According to certain embodiments, in the state in which a response of the location server 504 is not transmitted to the electronic device 501, the processor of the electronic device 501 may terminate the emergency call service by terminating the connection (e.g., EPDN session) between the emergency station 505 and the electronic device 501 via the short-range wireless communication module in operation 570.

According to certain embodiments, after the connection between the electronic device 501 and the emergency station 505 is terminated, the processor of the electronic device 501 may receive location information of the electronic device 501 from the location server 504 via the short-range wireless communication module in operation 580.

According to certain embodiments, in operation 590, the processor of the electronic device 501 may transmit the location information received from the location server 504 to the voice call assistant 503 via the short-range wireless communication module. In operation 591, the voice call assistant 503 may transmit the received location information of the electronic device 501 to the emergency station 505. Here, the received location information may be included in an update message associated with the VoWi-Fi session, and may be transmitted to the voice call assistant 503. For example, as shown in Table 2 below, "civic Address" may be included in "SIP update message format" of the VoWi-Fi session, and may be transmitted to the voice call assistant 503. The "SIP update message format" may further include "Call-ID" as information to identify the electronic device 501 (i.e., the user who requests the emergency call). The "Call-ID", which is generated by, for example, the processor of the electronic device 501, may be generated on the basis of information on the program determined in the negotiation process between the electronic device 501 and the voice call assistant 503 for establishing the VoWi-Fi session. The "SIP update massage format" may include a "timestamp" as time information to more clearly identify the electronic device 501 (i.e., the user who requests the emergency call). For example, the timestamp may include information on the time at which the processor of the electronic device 501 obtains the location information from the location server 504 via the short-range wireless communication module or information on the time at which the processor of the electronic device 501 transmits a request for an emergency call via the short-range wireless communication module. The location server 504 may obtain the location information, the identification information, and the time information from the received update message information, and may transmit the same to the emergency station 505.

TABLE 2

[-->] Update sip:119;phone-
context=testlab.samsung.com@testlab.samsung.com;user=phone
SIP/2.0 Via: SIP/2.0/TCP [2a00:8a00:7001:49e8::1]:6300;branch=
z9hG4bK-524287-1---f7fe134edd266790;rport;transport=TCP
Call-ID: MZXax56x3uOcMJ7hrkLukA..@2a00:8a00:7001:
49e8::1
<?xml version="1.0" encoding="UTF-8"?>
 <gp:geopriv>
  <gp:location-info>
   <gs:Circle xmlns:gs="http://www.opengis.net/pidflo/1.0"
srsName="urn:ogc:def:crs:EPSG::4326">
    <gml:pos>47.5815172 −122.1474094</gml:pos>
    <gs:radius uom="urn:ogc:def:uom:EPSG::9001">
    20.000000</gs:radius>
   </gs:Circle>
   <con:confidence pdf="normal">68</con:confidence >
   <cl:civicAddress>
    <cl:country>US</cl:country>
    <cl:A1>Washington</cl:A1>
    <cl:A3>Bellevue</cl:A3>
    <cl:A6>146th Pl SE</cl:A6>
    <cl:HNO>3245</cl:HNO>

TABLE 2-continued

```
        <cl:PC>98007</cl:PC>
      </cl:civicAddress>
    </gp:location-info>
  </gp:geopriv>
  <dm:timestamp>2017-09-13T00:37:09Z</dm:timestamp>
```

According to certain embodiments, a processor of an electronic device (e.g., electronic device 401 in FIG. 4 or the electronic device 501 in FIG. 5) may perform a process of asking for a user's consent for information collection. For example, the processor may display a pop-up message for asking for a user's consent for information collection on the display (e.g., the display device 160 in FIG. 1) prior to making a request for location information to a location server (e.g., the location server 404 in FIG. 4 or the location server 504 in FIG. 5). If a user input indicating acceptance is received from an input device (e.g., the input device 150 in FIG. 1), the processor may transmit a request for location information to the location server.

Figure 6:
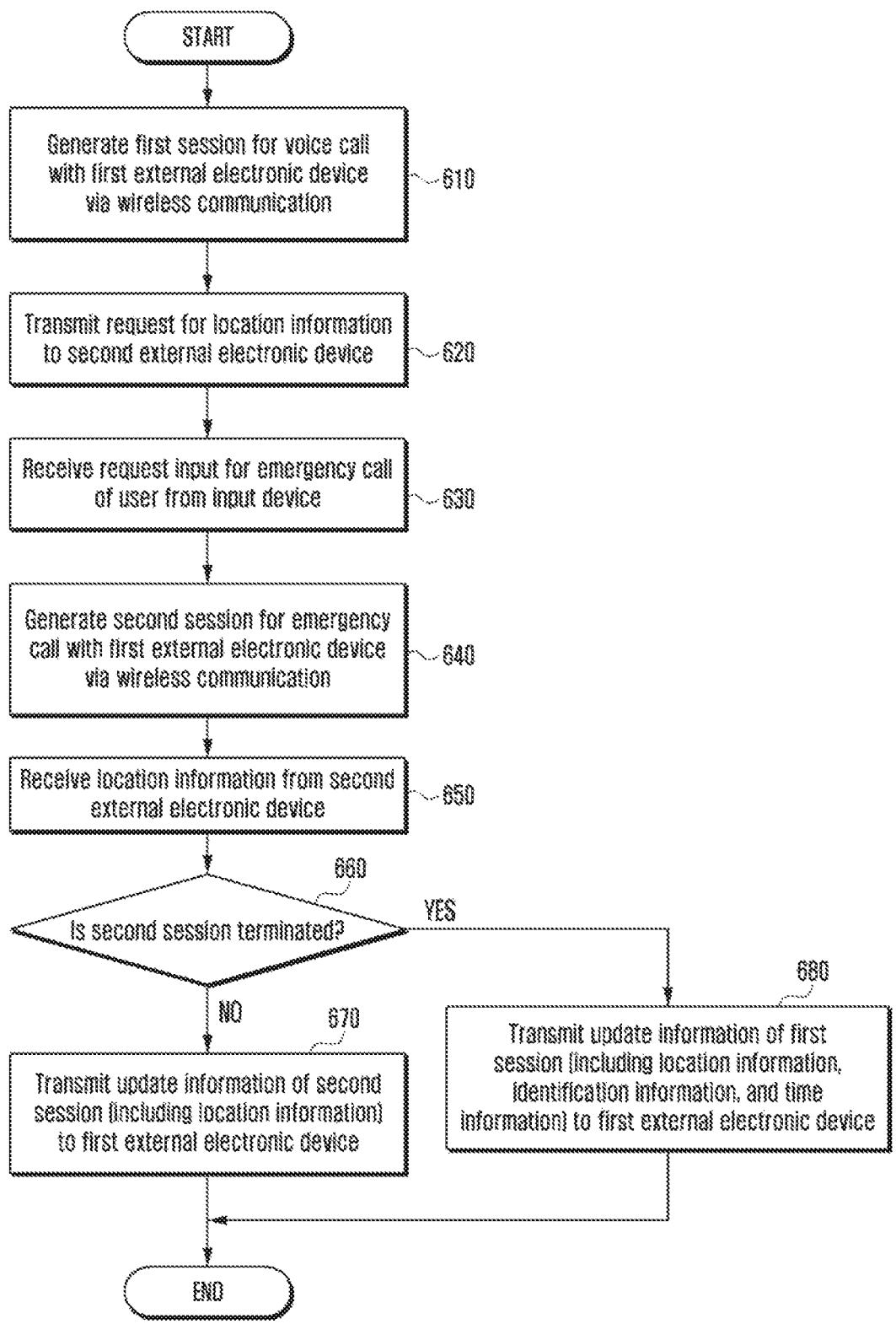
FIG. 6 is a flowchart explaining the operation of a processor in certain embodiments.

FIG. 6 is a flowchart explaining the operation of a processor in certain embodiments.

According to certain embodiments, in operation 610, a processor (e.g., the processor 120 in FIG. 1) of an electronic device (e.g., the electronic device 101 in FIG. 1, the electronic device 401 in FIG. 4, or the electronic device 501 in FIG. 5) may communicate with a first external electronic device (e.g., the first external electronic device 330 in FIG. 3) via a short-range wireless communication module, thereby generating a first session for a voice call.

According to certain embodiments, if the session is generated, the processor may transmit a request for location information of the electronic device to a second external electronic device (e.g., the second external electronic device 340 in FIG. 3) via the short-range wireless communication module in operation 620. The request may include at least one piece of, for example, network information (e.g., IP address) of an access point that is connected to the electronic device via wireless communication, GPS information (latitude and longitude) obtained via a wireless communication module (e.g., the wireless communication module 192 in FIG. 1), or cell information obtained from a cellular network (e.g., the second communication network 320 in FIG. 3) via the wireless communication module, which may be used to obtain the location information.

According to certain embodiments, in the state in which a response (e.g., a response message indicating the requested location information) is not received from the second external electronic device, the processor may receive a request input for an emergency call from the user through an input device (e.g., a touch-sensitive display, a keyboard, a keypad, a microphone, or an audio connector, etc.) in operation 630.

According to certain embodiments, in operation 640, in response to the request, the processor may communicate with the first external electronic device via the short-range wireless communication module, thereby generating a second session for an emergency call.

According to certain embodiments, after the second session is generated, the processor may receive location information from the second external electronic device via the short-range wireless communication module in operation 650.

According to certain embodiments, in operation 660, the processor may determine whether or not the second session is terminated. For example, the termination of the second session may mean termination of the emergency call between the electronic device and the emergency station (e.g., the third external electronic device 350 in FIG. 3).

According to certain embodiments, if the location information is received while the second session is maintained, the electronic device may transmit the location information, as update information of the second session, to the first external electronic device via the short-range wireless communication module in operation 670.

According to certain embodiments, if the location information is received after the second session is terminated, the electronic device may transmit the location information, as update information of the first session, to the first external electronic device via the short-range wireless communication module in operation 680. In addition, identification information (e.g., "Call-ID" in Table 2) and time information (e.g., a time at which the location information is received, a time at which one of the communication sessions is established, a "timestamp" as in Table 2e, etc.) may be transmitted, as update information of the first session, to the first external electronic device.

An electronic device according to certain embodiments may include: an input device; a short-range wireless communication module configured to connect the electronic device to the Internet via wireless communication; a global navigation satellite system (GNSS) communication module; a cellular communication module configured to connect the electronic device to a cellular network through wireless communication; and a processor electrically connected to the input device, the short-range wireless communication module, the GNSS communication module, and the cellular communication module, such that the processor may be configured to: generate a first communication session for a voice call in a packet switching scheme with the first external electronic device via the short-range wireless communication module; transmit a request for location information of the electronic device to a second external electronic device via the short-range wireless communication module; in the state in which a response to the request is not received from the second external electronic device, generate a second communication session for an emergency call with the first external electronic device via the short-range wireless communication module in response to reception of a request for an emergency call from the input device; and transmit the location information received from the second external electronic device, as update information of the first communication session or the second communication session, to the first external electronic device via the short-range wireless communication module.

The request for location information to be transmitted to the second external electronic device may include at least one piece of network information of an access point that is connected to the short-range wireless communication module through communication, latitude and longitude information obtained via the GNSS communication module, or cell information obtained via the cellular communication module.

The processor may be configured to: if the location information is received while the second communication session is maintained, transmit the location information, as update information of the second communication session, to the first external electronic device; and if the location information is received after the second communication session is terminated, transmit the location information, as update information of the first communication session, to the first external electronic device.

The update information of the first communication session may further include at least one piece of identification information or time information of the electronic device.

The identification information may be generated by the processor on the basis of a result of negotiation between the electronic device and the first external electronic device for the generation of the second communication session. The result may include at least one of a codec or a packet encryption algorithm.

The time information may be related to a time at which the location information is obtained or to a time at which the second communication session is generated.

The short-range wireless communication module may include a Wi-Fi module.

The first external electronic device may include a device of a mobile service provider operating the cellular network.

The second external electronic device may include a device configured to be connected to the Internet and to provide a location service to the electronic device.

The first communication session may include an internet protocol multimedia subsystem (IMS) session established between the first external electronic device and the electronic device through communication.

The second communication session may include an emergency packet data network (EPDN) session established between the first external electronic device and the electronic device through communication.

The location information may further include a country, a city, a street, and a lot number.

A method of operating an electronic device according to certain embodiments may include: generating a first communication session for a voice call in a packet switching scheme with a first external electronic device via a short-range wireless communication module operably connected to the electronic device; transmitting a request for location information of the electronic device to a second external electronic device via the short-range wireless communication module; in the state in which a response to the request is not received from the second external electronic device, generating a second communication session for an emergency call with the first external electronic device via the short-range wireless communication module in response to reception of a request for an emergency call from an input device, which is operably connected to the electronic device; and transmitting the location information received from the second external electronic device, as update information of the first communication session or the second communication session, to the first external electronic device via the short-range wireless communication module.

An electronic device according to certain embodiments may include: an input device; a short-range wireless communication module configured to connect the electronic device to the Internet through wireless communication; a global navigation satellite system (GNSS) communication module; a cellular communication module configured to connect the electronic device to a cellular network through wireless communication; a processor electrically connected to the input device, the short-range wireless communication module, the GNSS communication module, and the cellular communication module; and a memory electrically connected to the processor, such that the memory may include instructions that allow, when executed, the processor to: generate a first communication session for a voice call in a packet switching scheme with the first external electronic device via the short-range wireless communication module; transmit a request for location information of the electronic device to a second external electronic device via the short-range wireless communication module; in the state in which a response to the request is not received from the second external electronic device, generate a second communication session for an emergency call with the first external electronic device via the short-range wireless communication module in response to reception of a request for an emergency call from the input device; and transmit the location information received from the second external electronic device, as update information of the first communication session or the second communication session, to the first external electronic device via the short-range wireless communication module.

The embodiments of the present disclosure disclosed in the specification and the drawings are only particular examples proposed in order to easily describe the technical matters of the present disclosure and help with comprehension of the present disclosure, and do not limit the present disclosure. Therefore, in addition to the embodiments disclosed herein, certain embodiments of the present disclosure should be construed to include all modifications or modified forms drawn based on the technical idea of the certain embodiments of the present disclosure.

What is claimed is:
1. An electronic device, comprising:
an input device;
a short-range wireless communication module;
at least one processor electrically connected to the input device, the short-range wireless communication module,
a memory storing program instructions executable by the at least one processor to cause the electronic device to:
  establish a first communication session for a voice call with a first external electronic device using the short-range wireless communication module;
  transmit a request for location information of the electronic device to a second external electronic device via the short-range wireless communication module;
  when a response to the request is not received from the second external electronic device, and when an input is detected requesting an emergency call, establish a second communication session for the emergency call after the first communication session has been established, the second communication session established with the first external electronic device via the short-range wireless communication module; and
  after receiving the location information from the second external electronic device, updating the first or second communication session by transmitting the received location information to the first external electronic device via the short-range wireless communication module.

2. The electronic device of claim 1, further comprising:
a global navigation satellite system (GNSS) communication module; and
a cellular communication module,
wherein the request for location information comprises at least one of:
network information of an access point communicatively connected to the short-range wireless communication module,
latitude and longitude information obtained via the GNSS communication module, and
cell information obtained via the cellular communication module.

3. The electronic device of claim 1, wherein the program instructions are further executable by the at least one processor to cause the electronic device to:
after receiving the location information:
if the second communication session is active, transmitting the location information to the first external electronic device using the second communication session; and
if the second communication session is terminated, transmitting the location information to the first external electronic device using the first communication session.

4. The electronic device of claim 3, wherein updating the first communication session further comprises transmitting at least one of identification information and time information.

5. The electronic device of claim 4, wherein the identification information is generated by the at least one processor based on a negotiation between the electronic device and the first external electronic device for establishing the second communication session.

6. The electronic device of claim 5, wherein the second communication session is established using at least one of a codec or a packet encryption algorithm.

7. The electronic device of claim 4, wherein the time information indicates at least one of a first time at which the location information is received, and a second time at which the second communication session is established.

8. The electronic device of claim 1, wherein the short-range wireless communication module comprises a Wi-Fi module.

9. The electronic device of claim 1, wherein the first external electronic device comprises a packet communication network operated by a mobile service provider providing a cellular network.

10. The electronic device of claim 1, wherein the second external electronic device comprises a device communicatively connected to the Internet as to provide a location service to the electronic device.

11. The electronic device of claim 1, wherein the first communication session comprises an internet protocol multimedia subsystem (IMS) session established between the first external electronic device and the electronic device.

12. The electronic device of claim 1, wherein the second communication session comprises an emergency packet data network (EPDN) session established between the first external electronic device and the electronic device.

13. The electronic device of claim 1, wherein the location information further comprises a country, a city, a street, and a lot number.

14. A method of operating an electronic device, the method comprising:
establishing a first communication session for a voice call with a first external electronic device using a short-range wireless communication module operably connected to the electronic device;
transmitting a request for location information of the electronic device to a second external electronic device via the short-range wireless communication module;
when a response to the request is not received from the second external electronic device and when an input is detected requesting an emergency call, establishing a second communication session for the emergency call after the first communication session has been established, the second communication session established with the first external electronic device using the short-range wireless communication module; and
after receiving the location information from the second external electronic device, updating the first or second communication session by transmitting the received location information to the first external electronic device using the short-range wireless communication module.

15. The method of claim 14, wherein the request for location information comprises at least one of:
network information of an access point communicatively connected to the short-range wireless communication module,
latitude and longitude information obtained via a global navigation satellite system (GNSS) communication module, and
cell information obtained via a cellular communication module.

16. The method of claim 14, further comprising:
after receiving the location information:
if the second communication session is active, transmitting the location information to the first external electronic device using the second communication session; and
if the second communication session is terminated, transmitting the location information to the first external electronic device using the second communication session.

17. An electronic device comprising:
an input device;
a short-range wireless communication module;
a processor electrically connected to the input device and the short-range wireless communication module,
wherein the processor is configured to:
establish a first communication session for a voice call with a first external electronic device via the short-range wireless communication module;
transmit a request for location information of the electronic device to a second external electronic device via the short-range wireless communication module;
when a response to the request is not received from the second external electronic device and when an input is detected requesting an emergency call, generate a second communication session for the emergency call while maintaining the first communication session, the second communication session established with the first external electronic device using the short-range wireless communication module; and
after receiving the location information from the second external electronic device, update the first or second communication session by transmitting the received location information to the first external electronic device using the short-range wireless communication module.

18. The electronic device of claim 17, wherein the request for location information comprises at least one of:
network information of an access point communicatively connected to the short-range wireless communication module,
latitude and longitude information obtained via to global navigation satellite system (GNSS) communication module, and
cell information obtained via a cellular communication module.

19. The electronic device of claim 17, wherein the processor is further configured to:
after receiving the location information:

if the second communication session is active, transmitting the location information to the first external electronic device using the second communication session; and if the second communication session is terminated, transmitting the location information to the first external electronic device using the first communication session.

20. The electronic device of claim 19, wherein updating the first communication session further comprises transmitting at least one of identification information and time information.

\* \* \* \* \*